US008667132B2

(12) United States Patent
Koch

(10) Patent No.: US 8,667,132 B2
(45) Date of Patent: *Mar. 4, 2014

(54) ARRANGEMENT FOR COMMUNICATION ABOUT AND MANAGEMENT OF A RESOURCE USING A MOBILE DEVICE

(75) Inventor: Edward Koch, San Rafael, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,110

(22) Filed: Jul. 12, 2012

(65) Prior Publication Data
US 2012/0277920 A1 Nov. 1, 2012

Related U.S. Application Data

(63) Continuation-in-part of application No. 13/364,612, filed on Feb. 2, 2012, which is a continuation-in-part of application No. 13/019,943, filed on Feb. 2, 2011, which is a continuation-in-part of application No. 12/834,841, filed on Jul. 12, 2010.

(60) Provisional application No. 61/301,123, filed on Feb. 3, 2010, provisional application No. 61/271,084, filed on Jul. 17, 2009.

(51) Int. Cl.
*G05F 5/00* (2006.01)
(52) U.S. Cl.
USPC ............ 709/224; 709/223; 370/335; 370/338
(58) Field of Classification Search
USPC ............................ 709/223, 224; 370/335, 338
See application file for complete search history.

(56) References Cited

U.S. PATENT DOCUMENTS

| 4,110,827 A | 8/1978 | Shavit |
| 4,130,874 A | 12/1978 | Pai |

(Continued)

FOREIGN PATENT DOCUMENTS

| WO | WO 2005033964 | 4/2005 |
| WO | WO 2008027455 | 3/2008 |

(Continued)

OTHER PUBLICATIONS http://en.wikipedia.org/wiki/Demand_response, "Demand Response," 10 pages, printed Feb. 3, 2012.

(Continued)

*Primary Examiner* — Tesfay Yohannes
(74) *Attorney, Agent, or Firm* — Seager Tufte & Wickhem LLC.

(57) ABSTRACT

An arrangement for communications about, and management of a resource, such as energy, using a mobile device. A utility provides a resource for a facility. The facility can provide a resource in another sense. The utility has an information system that sends messages and data relative to the utility and the facility, to the mobile device. The mobile device provides commands and data, based on messages from the utility to an energy management system of the facility. The energy management system sends messages and data to the mobile device. The mobile device sends commands and data to the utility information system. A facility manager uses the mobile device and makes decisions relative to communications at the device. The communications are wireless and the device is portable and operated at various locations. The communications can involve other energy management systems and facilities.

18 Claims, 4 Drawing Sheets

(56) References Cited

U.S. PATENT DOCUMENTS

| | | | |
|---|---|---|---|
| 4,153,936 A * | 5/1979 | Schmitz et al. | 700/296 |
| 4,419,667 A | 12/1983 | Gurr et al. | |
| 4,850,010 A | 7/1989 | Stanbury et al. | |
| 4,937,760 A | 6/1990 | Beitel et al. | |
| 5,341,142 A | 8/1994 | Reis et al. | |
| 5,500,561 A | 3/1996 | Wilhelm | |
| 5,566,084 A | 10/1996 | Cmar | |
| 5,572,438 A | 11/1996 | Ehlers et al. | |
| 5,598,349 A | 1/1997 | Elliason et al. | |
| 5,719,854 A * | 2/1998 | Choudhury et al. | 370/231 |
| 5,822,553 A | 10/1998 | Gifford et al. | |
| 5,892,758 A * | 4/1999 | Argyroudis | 370/335 |
| 6,026,375 A | 2/2000 | Hall et al. | |
| 6,195,367 B1 | 2/2001 | Jakobik et al. | |
| 6,209,018 B1 | 3/2001 | Ben-shachar et al. | |
| 6,252,950 B1 * | 6/2001 | Duty et al. | 379/111 |
| 6,259,723 B1 | 7/2001 | Miyashita | |
| 6,278,717 B1 * | 8/2001 | Arsenault et al. | 370/477 |
| 6,289,384 B1 | 9/2001 | Whipple et al. | |
| 6,366,926 B1 | 4/2002 | Pohlmann et al. | |
| 6,446,136 B1 | 9/2002 | Pohlmann et al. | |
| 6,519,509 B1 | 2/2003 | Nierlich et al. | |
| 6,529,723 B1 | 3/2003 | Bentley | |
| 6,566,926 B1 | 5/2003 | Patterson | |
| 6,574,581 B1 | 6/2003 | Bohrer et al. | |
| 6,865,685 B2 | 3/2005 | Hammond et al. | |
| 7,010,700 B1 | 3/2006 | Foss et al. | |
| 7,039,532 B2 | 5/2006 | Hunter | |
| 7,069,309 B1 | 6/2006 | Dodrill et al. | |
| 7,260,616 B1 | 8/2007 | Cook | |
| 7,333,880 B2 | 2/2008 | Brewster et al. | |
| 7,337,237 B2 | 2/2008 | Salahshoor et al. | |
| 7,346,467 B2 | 3/2008 | Bohrer et al. | |
| 7,392,115 B2 | 6/2008 | Schindler | |
| 7,401,086 B2 | 7/2008 | Chorafakis et al. | |
| 7,528,503 B2 | 5/2009 | Rognli et al. | |
| 7,565,227 B2 | 7/2009 | Richard et al. | |
| 7,650,289 B2 | 1/2010 | Cooper et al. | |
| 7,676,657 B2 | 3/2010 | Lindholm et al. | |
| 7,702,424 B2 | 4/2010 | Cannon et al. | |
| 7,742,953 B2 | 6/2010 | King et al. | |
| 7,775,191 B2 | 8/2010 | Hou | |
| 7,797,009 B2 | 9/2010 | Kiiskila et al. | |
| 7,806,845 B2 | 10/2010 | Arm et al. | |
| 7,845,576 B2 | 12/2010 | Siddaramanna et al. | |
| 7,865,252 B2 | 1/2011 | Clayton | |
| 7,873,441 B2 | 1/2011 | Synesiou et al. | |
| 7,885,718 B2 | 2/2011 | Yano et al. | |
| 7,886,166 B2 | 2/2011 | Shnekendorf et al. | |
| 7,925,384 B2 | 4/2011 | Huizenga et al. | |
| 7,941,528 B2 | 5/2011 | Hicks, III et al. | |
| 7,954,726 B2 | 6/2011 | Siddaramanna et al. | |
| 7,958,229 B2 | 6/2011 | Conway | |
| 8,073,558 B2 | 12/2011 | Koch et al. | |
| 8,091,794 B2 | 1/2012 | Siddaramanna et al. | |
| 8,140,658 B1 | 3/2012 | Gelvin et al. | |
| 8,163,276 B2 | 4/2012 | Hedrick et al. | |
| 8,170,774 B2 | 5/2012 | Forte et al. | |
| 8,183,995 B2 | 5/2012 | Wang et al. | |
| 8,199,773 B2 | 6/2012 | Aubin et al. | |
| 8,232,745 B2 | 7/2012 | Chemel et al. | |
| 8,234,876 B2 | 8/2012 | Parsonnet et al. | |
| 8,260,468 B2 | 9/2012 | Ippolito et al. | |
| 8,291,243 B2 | 10/2012 | Castelli et al. | |
| 8,327,024 B2 | 12/2012 | Pattison et al. | |
| 8,352,094 B2 | 1/2013 | Johnson et al. | |
| 8,373,547 B2 | 2/2013 | Benya et al. | |
| 8,406,937 B2 | 3/2013 | Verfuerth et al. | |
| 8,417,391 B1 | 4/2013 | Rombouts et al. | |
| 2002/0004827 A1 * | 1/2002 | Ciscon et al. | 709/223 |
| 2003/0016237 A1 | 1/2003 | Hickey | |
| 2003/0033230 A1 | 2/2003 | Mccall | |
| 2003/0174067 A1 * | 9/2003 | Soliman | 340/870.02 |
| 2003/0233064 A1 | 12/2003 | Arm et al. | |
| 2004/0034484 A1 | 2/2004 | Solomita, Jr. et al. | |
| 2004/0137897 A1 | 7/2004 | Teixeira | |
| 2004/0203649 A1 | 10/2004 | Cashiola | |
| 2005/0027636 A1 | 2/2005 | Gilbert et al. | |
| 2005/0152694 A1 | 7/2005 | Chown | |
| 2005/0172304 A1 | 8/2005 | Tavares et al. | |
| 2005/0194456 A1 | 9/2005 | Tessier et al. | |
| 2005/0229220 A1 | 10/2005 | Fisher et al. | |
| 2005/0262026 A1 | 11/2005 | Watkins | |
| 2006/0109829 A1 * | 5/2006 | O'Neill | 370/338 |
| 2007/0005195 A1 | 1/2007 | Pasquale et al. | |
| 2007/0214033 A1 * | 9/2007 | Miller | 705/8 |
| 2007/0222295 A1 | 9/2007 | Wareham et al. | |
| 2008/0011864 A1 | 1/2008 | Tessier et al. | |
| 2008/0046715 A1 | 2/2008 | Balazs et al. | |
| 2008/0167931 A1 | 7/2008 | Gerstemeier et al. | |
| 2008/0172312 A1 * | 7/2008 | Synesiou et al. | 705/34 |
| 2008/0177678 A1 | 7/2008 | Di Martini et al. | |
| 2008/0262848 A1 | 10/2008 | Shienbrood et al. | |
| 2009/0046625 A1 * | 2/2009 | Diener et al. | 370/319 |
| 2009/0092062 A1 | 4/2009 | Koch et al. | |
| 2009/0187499 A1 | 7/2009 | Mulder et al. | |
| 2009/0198384 A1 | 8/2009 | Ahn | |
| 2009/0204977 A1 | 8/2009 | Tavares et al. | |
| 2009/0271255 A1 | 10/2009 | Utter et al. | |
| 2009/0281674 A1 | 11/2009 | Taft | |
| 2009/0295594 A1 | 12/2009 | Yoon | |
| 2009/0297488 A1 | 12/2009 | Fraser et al. | |
| 2009/0313083 A1 | 12/2009 | Dillon et al. | |
| 2009/0319090 A1 | 12/2009 | Dillon et al. | |
| 2009/0326726 A1 | 12/2009 | Ippolito et al. | |
| 2010/0057480 A1 | 3/2010 | Arfin et al. | |
| 2010/0076615 A1 | 3/2010 | Daniel et al. | |
| 2010/0076835 A1 | 3/2010 | Silverman | |
| 2010/0088261 A1 | 4/2010 | Montalvo | |
| 2010/0106342 A1 | 4/2010 | Ko et al. | |
| 2010/0106543 A1 | 4/2010 | Marti | |
| 2010/0114340 A1 | 5/2010 | Huizenga et al. | |
| 2010/0138363 A1 | 6/2010 | Batterberry et al. | |
| 2010/0168924 A1 | 7/2010 | Tessier et al. | |
| 2010/0274377 A1 | 10/2010 | Kaufman et al. | |
| 2010/0283606 A1 | 11/2010 | Tsypin et al. | |
| 2010/0324962 A1 | 12/2010 | Nesler et al. | |
| 2011/0016200 A1 | 1/2011 | Koch | |
| 2011/0040550 A1 | 2/2011 | Graber et al. | |
| 2011/0040666 A1 | 2/2011 | Crabtree et al. | |
| 2011/0046805 A1 | 2/2011 | Bedros et al. | |
| 2011/0093493 A1 | 4/2011 | Nair et al. | |
| 2011/0113068 A1 | 5/2011 | Ouyang et al. | |
| 2011/0125542 A1 | 5/2011 | Koch | |
| 2011/0172836 A1 | 7/2011 | Boss et al. | |
| 2011/0172838 A1 | 7/2011 | Pai et al. | |
| 2011/0196539 A1 | 8/2011 | Nair et al. | |
| 2011/0196546 A1 | 8/2011 | Muller et al. | |
| 2011/0199209 A1 | 8/2011 | Siddaramanna et al. | |
| 2011/0212700 A1 | 9/2011 | Petite | |
| 2011/0231320 A1 | 9/2011 | Irving | |
| 2011/0258049 A1 | 10/2011 | Ramer et al. | |
| 2011/0301774 A1 | 12/2011 | Koch | |
| 2012/0066397 A1 | 3/2012 | Koch et al. | |
| 2012/0066686 A1 | 3/2012 | Koch | |
| 2012/0084696 A1 | 4/2012 | Marti | |
| 2012/0093141 A1 | 4/2012 | Imes et al. | |
| 2012/0109399 A1 | 5/2012 | Tran | |
| 2012/0136915 A1 | 5/2012 | Koch | |
| 2012/0173030 A1 | 7/2012 | Taft | |
| 2012/0197456 A1 | 8/2012 | Walter et al. | |
| 2012/0197457 A1 | 8/2012 | Walter et al. | |
| 2012/0197458 A1 | 8/2012 | Walter et al. | |
| 2012/0245968 A1 | 9/2012 | Beaulieu et al. | |
| 2012/0271473 A1 | 10/2012 | Koch | |
| 2013/0035992 A1 | 2/2013 | Silverman | |
| 2013/0079931 A1 | 3/2013 | Wanchoo et al. | |

FOREIGN PATENT DOCUMENTS

| | | |
|---|---|---|
| WO | WO 2008027457 | 3/2008 |
| WO | WO 2009/006133 | 1/2009 |
| WO | WO 2009/020606 | 2/2009 |
| WO | WO 2009/023230 | 2/2009 |

(56) References Cited

FOREIGN PATENT DOCUMENTS

| WO | WO 2009/027617 | 3/2009 |
|---|---|---|
| WO | WO 2009/085610 | 7/2009 |
| WO | WO 2011/065007 | 6/2011 |
| WO | WO 2013/025565 | 2/2013 |
| WO | WO 2013/055551 | 4/2013 |

OTHER PUBLICATIONS https://buildingsolutions.honeywell.com/Cultures/en-US/Markets/Utilities/DemandResponse/, 1page, printed Feb. 3, 2012.

Kiliccote et al., "Findings from Seven Years of Field Performance Data for Automated Demand Response in Commercial Buildings," Lawrence Berkeley National Laboratory, Report No. LBNL-3643E, May 2010.

Kiliccote et al., "Open Automated Demand Response for Small Commercial Buildings," Lawrence Berkeley National Laboratory, Resort No. LBNL-2195E, 104 pages, Jul. 2009.

Kiliccote et al., "Open Automated Demand Response Communications in Demand Response for Wholesale Ancillary Services," Lawrence Berkeley National Laboratory, Report No. LBNL-2945E, 13 pages, Nov. 2009.

Koch et al., "Architecture Concepts and Technical Issues for an Open, Interoperable Automated Demand Response Infrastructure," Berkeley National Laboratory, Report No. LBNL-63664, 7 pages, Oct. 2007.

Koch et al., "Direct Versus Facility Centric Load Control for Automated Demand Response," Lawrence Berkeley National Laboratory, Report No. LBNL-2905E, 11 pages, Nov. 2009.

Koch et al., "Scenarios for Consuming Standardized Automated Demand Response Signals," Lawrence Berkele National Laborator, Report No. LBNL-1362E, 10 pages, Nov. 2008.

Koch, "The Demand Response Automation Server (DRAS)," Building Performance, http://www.akuacom.com/assets/pdf/ASHRAE_2008_Ed_Koch.pdf, 18 pages., prior to Nov. 17, 2011.

Piette et al., "Automated Critical Peak Pricing Field Tests: 2006 Pilot Program Description and Results," Berkeley National Laboratory, Report No. LBNL-62218, 67 pages, Aug. 2007.

Piette et al., "Automated Critical Peak Pricing Field Tests: Program Description and Results," Lawrence Berkeley National Laboratory, Report No. LBNL-59351, Apr. 2006.

Piette et al., "Design and Implementation of an Open, Interoperable Automated Demand Response Infrastructure," Berkeley National Laboratory, Report No. LBNL-63665, 6 pages, Oct. 2007.

Piette et al., "Findings From the 2004 Fully Automated Demand Response Tests in Large Facilities," Lawrence Berkeley National Laboratory, Report No. LBNL-58178, 197 pages, Sep. 2005.

Piette et al., "Linking Continuous Energy Management and Open Automated Demand Response," Lawrence Berkeley National Laboratory, Report No. LBNL-1361E, 9 pages, Nov. 2008.

Piette et al., "Open Automated Demand Response Communications Specification," Version 1.0, CEC-500-2009-063, 214 pages, Apr. 2009.

Piette et al., "Participation through Automation: Fully, Automated Critical Peak Pricing in Commercial Buildings," Berkeley National Laboratory, Report No. LBNL-60614, 14 pages, Aug. 13-18, 2006.

Watson et al., "Machine to Machine (M2M) Technology in Demand Responsive Commercial Buildings," Berkeley National Laboratory, Report No. LBNL-55087, 18 pages, Aug. 2004.

Yin et al., "Auto-DR and Pre-Cooling of Buildings at Tri-City Corporate Center," Lawrence Berkeley National Laboratory, Report No. LBNL-3348, 140 pages, Nov. 2008.

U.S. Appl. No. 13/621,195, filed Sep. 15, 2012.

Abdullah et al., "Demand-Side Energy Management Performed Using Direct Feedback via Mobile Systems: Enables Utilities to Deploy Consumer Based Demand Response Programs," 2010 IEEE International Energy Conference and Exhibition, pp. 172-177, 2010.

European Search Report for Related Application No. EP 12169650.4, Dated Nov. 22, 2012.

"Demand Response Measurement and Verification Literature Review," 29 pages, prior to Nov. 29, 2012.

"Smart Demand Response: A Discussion Paper," Energy Networks Association, energyuk, 44 pages, prior to Nov. 29, 2012.

International Search Report for PCT ApplicationSerial No. pct/us2012/058537, International Filing Date Oct. 3, 2012.

U.S. Appl. No. 13/689,551, filed Nov. 29, 2012.

Hunt, "Automated Demand Response System and Advanced End-Use Services Platform," Optimal Technologies, 31, pages, Sep. 24, 2004.

Olson, "New Approaches in Automating and Optimizing Demand Response to Solve Peak Load Management Problems," Building IQ brochure, 8 pages, 2011.

Schisler et al., "The Role of Demand Response in Ancillary Services Markets," IEEE, 3 pages, 2008.

Violette et al., "DRR Valuation and Market Analysis vol. II: Assessing the DRR Benefits and Costs," Summit Blue Consulting, 112 pages, Jan. 6, 2006.

Zaidi et al., "Load Recognition for Automated Demand Response in Microgrids," IEEE, pp. 2436-2439, 2010.

Coughlin et al., "Estimating Demand Response Load Impacts: Evaluation of Baseline Load Models for Non-Residential Buildings in California," Lawrence Berkeley National Laboratory, Report No. LBNL-63728, 33 pages, Jan. 2008.

Cruz, "Tutorial on GPU Computing with an Introduction to CUDA," 37 pages, prior to Nov. 17, 2011.

Holmberg, "Facility Interface to the Smart Grid," National Institute of Standards and Technology, 7 pages, printed 2012.

Honeywell, "Automated Demand Response—Southern California Program," 2 pages, printed Aug. 1, 2011.

Honeywell, "The Perfect Response to Peak Events," 4 pages, Nov. 2010.

* cited by examiner

ARRANGEMENT FOR COMMUNICATION ABOUT AND MANAGEMENT OF A RESOURCE USING A MOBILE DEVICE

This application is a continuation-in-part of U.S. patent application Ser. No. 13/364,612, filed Feb. 2, 2012, entitled An Installation System for Demand Response Sources, which is a continuation-in-part of U.S. patent application Ser. No. 13/019,943, filed Feb. 2, 2011, entitled "A Demand Response Management System", which claims the benefit of U.S. Provisional Patent Application No. 61/301,123, filed Feb. 3, 2010, and entitled "Demand Response Management System". U.S. patent application Ser. No. 13/019,943, filed Feb. 2, 2011, is hereby incorporated by reference. U.S. Provisional Patent Application No. 61/301,123, filed Feb. 3, 2010, is hereby incorporated by reference. U.S. patent application Ser. No. 13/364,612, filed Feb. 2, 2012, is incorporated by reference.

This application is a continuation-in-part of U.S. patent application Ser. No. 13/364,612, filed Feb. 2, 2012, entitled An Installation System for demand Response Resources", which is a continuation-in-part of U.S. patent application Ser. No. 13/019,943, filed Feb. 2, 2011, entitled "A Demand Response Management System", which is a continuation-in-part of U.S. patent application Ser. No. 12/834,841, filed Jul. 12, 2010, and entitled "A System for Providing Demand Response Services", which claims the benefit of U.S. Provisional Patent Application No. 61/271,084, filed Jul. 17, 2009. U.S. patent application Ser. No. 12/834,841, filed Jul. 12, 2010, is hereby incorporated by reference. U.S. Provisional Patent Application No. 61/271,084, filed Jul. 17, 2009, is hereby incorporated by reference.

BACKGROUND

The present disclosure pertains to utility resources and particularly to assessment and distribution of the resources. More particularly, the disclosure pertains to beneficial management of resources and their loads.

SUMMARY

The disclosure reveals an arrangement for communication about and management of a resource, such as energy, using a mobile device. A utility may provide the resource for a facility in one sense and the facility may provide or be a resource in another sense. The utility may have a utility information system that sends messages and data relative to the utility and the facility to the mobile device. The mobile device may provide commands and data based on the messages from the utility to an energy management system of the facility. The energy management system may send messages and data to the mobile device. The mobile device may send commands and data to the utility information system. A facility manager may be a user of the mobile device and make decisions relative to the communications at the device. The communications may be wireless and the device may be portable and operated at various locations. The communications may involve other energy management systems and facilities.

DESCRIPTION

Figure 1:
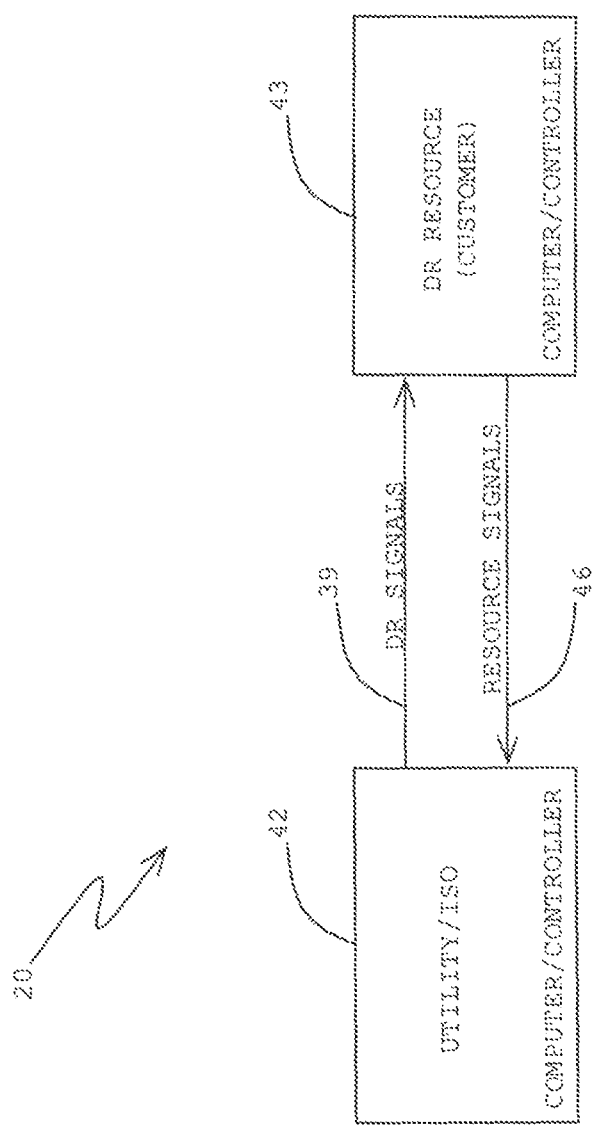
FIG. 1 is a diagram of an example demand response system.

An effective resource is especially critical when communities are confronted with a scarcity of a resource in question. It may be noted that "resource" is a term which may have several senses or meanings. "Resource" may refer to energy, commodity, product, load, and so on. In another sense or meaning, "resource" such as a demand response (DR) resource may refer to a customer, user, participant, facility, and so on. In the first mentioned sense, it may refer to electricity, water, gas and natural resources such as oil. A definition of "resource" may be extended to include such things such as water quality and air quality. In this regard, adequate water quality and air quality appear necessary to support a self-sustaining environment.

Resource management, in several senses, may be necessary so that systems can optimize the use of a limited resource. Currently, there are various systems for managing resources in various environments such as buildings, apartments, industrial facilities, and computing systems.

One mechanism that might be used to encourage customers to reduce demand and thereby reduce the peak demand for electricity may be referred to as demand response (DR). Demand response may refer to management of the demand by customers in response to supply conditions. For example, electricity customers may reduce their consumption at critical times and/or costs in response to market prices. These customers may be regarded as DR resources.

DR programs may require that a utility and/or independent service operator (ISO) deliver DR signals to customers or participants via a communications channel. The programs may relate to a distribution of resources such as, but not limited to, electricity, water and natural gas.

DR signals may incorporate business level information, such as prices, reliability and shed levels. At some point, from the utility/ISO to loads in a facility, the business level information sent by the utility/ISO should be processed and used to execute a DR strategy and program for the facility.

DR programs may take many forms. They may differ from normal rates and tariffs in that the DR programs are designed to allow the utility/ISO take specific actions to influence the load profiles of facilities that participate in the DR programs at peak consumption times or periods on a grid. The peak consumption periods may cause critical grid reliability issues which should be addressed, but they may also trigger economic factors where the price of electricity or other power commodity reaches a critical level which may be ameliorated by reducing the overall consumption on the grid during those periods. The critical periods, in which the utility/ISO needs to influence a load profile of a facility, may be referred to as DR events.

A manner in which a utility/ISO may influence a load profile of a facility is to send out a DR signal which is specific to the DR event. DR signals may contain information related to businesses, controlling loads, pricing, and so on. There may be an automated DR where the DR signals that are sent out by the utility/ISO are responded to in an automated fashion. Loads within a facility may ultimately be affected by DR events via DR signals to which the facility acts upon or responds. The term "facility" may refer to virtually any location in which there are loads influenced by DR events. A place where there are such loads may be regarded as a "DR resource". The term "utility" may be used in a general sense to refer to a utility, independent system operator, service provider, and the like.

To provide a context for a mobile communication approach, the present disclosure reveals an implementation of DR signals which may be noted in a demand response arrangement 20 on a diagram of FIG. 1. System 20 and associated software may be obtained and operated with one or more computers/controllers (controllers) 42, 43 and respective connections. The arrangement may be a system that is used by utilities/ISO's to manage the operation of DR programs. A focus of the arrangement may be on the operational aspects of managing the selection, signaling and monitoring of the DR resources that are participating in DR programs. The arrangement may be specifically designed to manage operations of automated DR programs.

There may be various types of interactions that might occur between the utility/ISO and a DR resource as part of a DR program. FIG. 1 is a diagram of an example interaction between a utility/ISO 42 and a DR resource (customer) 43. There may be DR signals 39 going from utility/ISO 42 to DR resource 43. There may be DR resource signals 46 incorporating information, such as load measurements, going from DR resource 43 to utility/ISO 42.

Terms such as customer, client, user, participant, DR resource, and like terms, may be used, interchangeably or distinct from one another, depending on a context of a pertinent portion of a description or a claim.

A description of DR signals 39 may be noted. At a high level, there may often be some sort of grid condition, be it economic or grid reliability in nature, which triggers a so-called DR event that requires some sort of interaction between the utility/ISO 42 and its customer 43. This interaction may eventually trigger some sort of load control taking place at a customer's facility. The interaction between the utility/ISO 42 and the customer 43 may be mediated by DR signals 39 and DR resource signals 46, i.e., information such as measurements. Signals 39 and 46 may represent communications between utility/ISO 42, and the DR resource or customer 43. Information contained within DR signals 39 may dictate where much of the decision-making takes place relative to, for example, in how the initial grid condition, which triggered the DR event, results in the eventual load control.

A computer or controller may incorporate one or more inputs, a processor, a user interface incorporating a keyboard, a display and a touch screen, a memory, external connections such as an internet, one or more outputs, and so forth. The computer or controller may be utilized with virtually all items in and pertinent to FIGS. 1-4.

Automated demand response (ADR) programs may be used in a number of different customer market segments ranging from large commercial and industrial to small commercial and residential areas. The number of small commercial facilities may typically outnumber the larger commercial and industrial facilities by an order of magnitude. In addition, the large commercial and industrial facilities may typically have a dedicated staff and a larger budget for installing the equipment necessary to participate in ADR programs.

There may be a use of mobile devices to receive notifications and manage energy based upon location. Utilities may increasingly communicate with their customers to enable them to better manage their energy usage. Communications of these utilities may range from sending their customers energy prices to notifying them of upcoming DR events. In addition to sending their customers information, the utilities may also allow their customers to communicate with them to perform such functions as opting out of DR events or submitting bids as part of a DR program. The increased communications with utilities may create new opportunities for customers to save money by more actively controlling their energy consumption. The approach by which a customer controls its energy consumption may increasingly be done by some sort of automation in the form of a so-called energy management system (EMS). Any system that is capable of controlling customer loads which consume energy may be considered as an EMS. An EMS may be as sophisticated as an industrial control system or as simple as a thermostat. An EMS may be at a facility of a customer.

One approach by which customers and utilities currently communicate may be via the internet and some sort of computer system which requires the customer to be at some fixed location. Here, interactions may be via email or perhaps via some web-based application. Likewise, the way that the customer typically interacts with its EMS may be either directly at the facility with the EMS, or via some computer-based terminal or user interface. None of these interactions may be possible if the user is not at a location that will support the respective interaction.

What is needed is an approach for the customer to interact with the utility or an EMS at a facility in a more convenient fashion that is flexible and can go anywhere that the customer goes. In addition, since the customer is mobile, what is needed may be a way for the customer to receive communications from the utility and to interact with a facility EMS in a fashion that is relevant to its location. A location of the mobile device may affect scenarios or a relevance of knowing something from an item at another location. Examples of where a customer's location is via the mobile device may be relevant in various scenarios relating to utilities and facilities.

A customer with a mobile device may be moving between different facilities in which each facility has its own energy tariff or agreement with potentially different utilities. Examples may include different rates for different regions. A utility may decide to include different facilities in a DR event. A utility may have different agreements, obligations or options with two or more facilities resulting in messages and data from the utility information system being different for various energy management systems of the two or more facilities, respectively. The differences of these items may be noticed by the customer at different locations of the mobile device.

It may be noted that, relative to a facility, sub-systems that the customer may need to interact with may depend upon where the sub-systems are located.

Certain devices, such as cell phones which are becoming more powerful, may become an effective approach for two-way communications and be a prime candidate to allow mobile customers to both communicate with utilities and to interact with their EMS's at various locations.

Mobile devices, such as smart phones, do not necessarily just send and receive messages, but they may provide a way to run fairly sophisticated applications that can be used for remote monitoring and control of energy.

The present approach may use a location of a device as an element to put the communications with the utility and the interactions with a customer's EMS into a context that is most relevant to where the customer is currently located.

Figure 2:
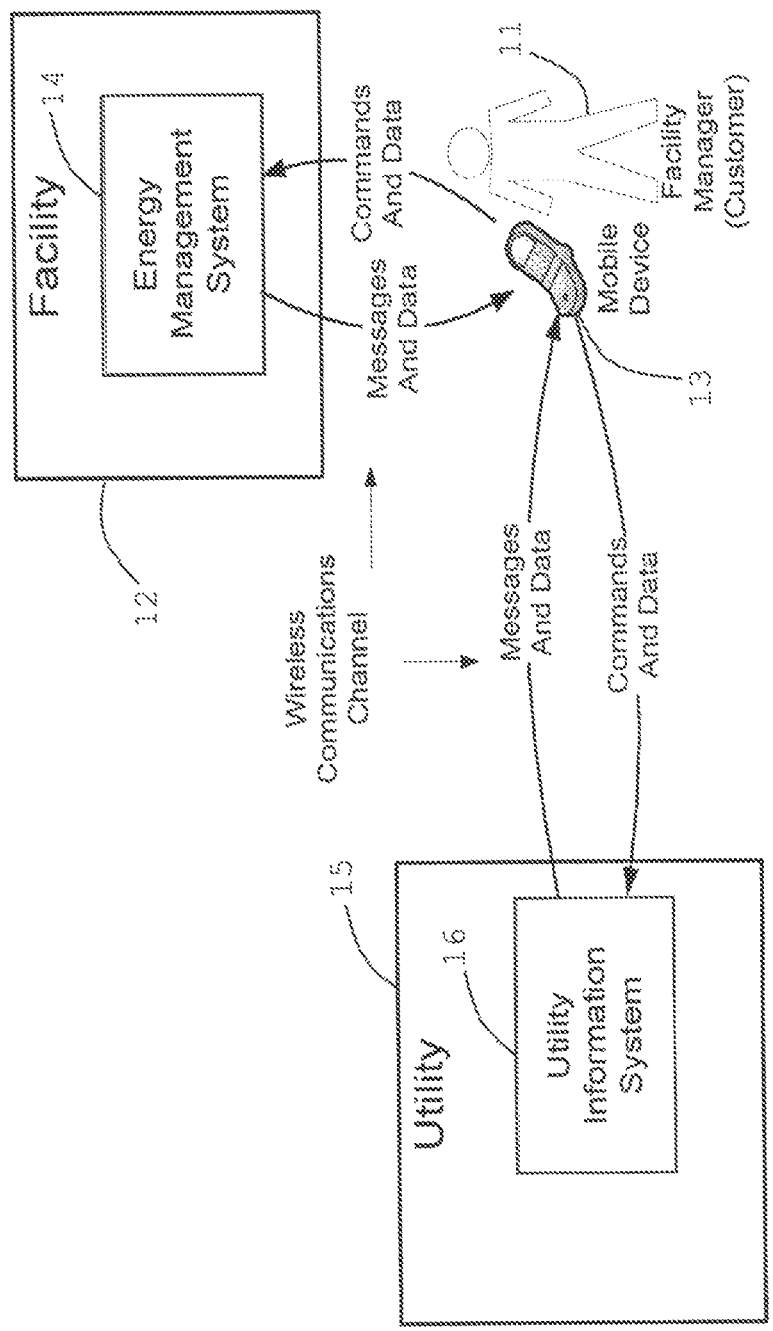
FIG. 2 is a diagram pertaining to energy related interactions.

FIG. 2 is a diagram of a use case. The diagram may pertain to energy related interactions. The diagram shows a facility manager (FM) 11 that may be responsible for managing the operations of a facility 12 as it relates to energy consumption. The facility manager 11 may be a person responsible for spending virtually all of his or her time managing a large facility operation, or manager 11 could simply be a small business owner that does nothing more than adjusts its thermostat and lights. FM 11 may be at various locations during the course of the day either on or off site of a facility. FM 11 may carry a mobile device (MD) 13. MD 13 may have the following characteristics. It may be a computing device that is easy to transport around, such as a cell phone, pad, smart phone, tablet or laptop. MD 13 may have a way to communicate wirelessly using technologies such as cellular media or WiFi.

MD 13 may have some sort of user interface that can display data or messages communicated via the wireless communications and receive inputs from the FM 11 that can be transmitted on a wireless communications channel.

MD 13 may have a way to run applications to support the user interface either natively or using some sort of web-based browser technology. MD 13 may have a way to determine the location of the device, either by the device itself or by the system with which the device is communicating.

Facility manager 11 may have a mobile device 13 for communication with an energy management system or sub-system (EMS) 14 of a facility 12 and with a utility information system or sub-system (UIS) 16 of utility 15. Mobile device 13 may be used by facility manager 11 to send commands and data to energy management system 14 and to receive messages and data from energy management system 14. Also, mobile device 13 may be used by facility manager 11 to send commands and data to utility information system 16 and to receive messages and data from utility information system 16. A conveyance medium for the sending commands and data and receiving messages and data may be a wireless communications channel.

As shown in FIG. 2, a utility 15 may have an information system 16 that is responsible for interacting with the customer with regards to energy consumption matters. UIS 16 may be selected from a wide range of systems and might include a DR management system (DRMS) or some system that is responsible for sending out dynamic rate information.

When the FM 11 is using MD 13 to interact with utility 15, the information that is displayed to FM 11 may be relevant to where FM 11 is located. Such information may include things such as location specific prices, requests for bids, DR signals and/or messages.

FM 11 may send commands and data back to utility 15, such as bids or perhaps notifications to opt out of responses to DR events. In addition, FM 15 may interact with different utilities based upon his or her location, especially if FM 11 is managing facilities that are in different regions of the country.

In order for the interactions to be location specific, the information and data from UIS 16 displayed to FM 11 as well as the commands and data sent from FM 11 should be dependent upon the location of MD 13. This may be accomplished in the following ways. The location of MD 13 may be determined by UIS 16, and UIS 16 may just send information that is relevant to that location. UIS 16 may send out information for virtually all of the possible locations of MD 13, and MD 13 may just present the information that is specific to where it is located at that time.

The approach by which the location of MD 13 is determined may incorporate all of the well known methodologies in use today for such purpose. For example, the approach may incorporate a global positioning system (GPS) within MD 13, cellular tower locations, WiFi access point locations, WiFi signal strengths, Bluetooth access point locations, and other remote location communication mechanisms.

Furthermore, it may be possible for UIS 16 to determine the location of MD 13 based upon one of the above methodologies or it may rely on MD 13 to determine its own location and transmit the location to UIS 16.

FM 11 may interact with EMS 14 of facility 12, and use wireless communications to do so. The messages and data transmitted from EMS 14 to FM 11 may be relevant to the particular loads that FM 11 is controlling, and may allow FM 11 to monitor and control EMS 14 in a fashion that best optimizes use by EMS 14 the information received from UIS 16. Examples may incorporate changing thermostat setpoints based on changing prices from UIS 16.

One may note that FIG. 2 does not necessarily preclude or require a scenario where UIS 16 also communicates with EMS 14 directly as may be the case with certain automated DR programs. In fact, a role of FM 11 in such cases may be to make minor adjustments to the EMS 14 automation that is already programmed into a system.

Figure 3:
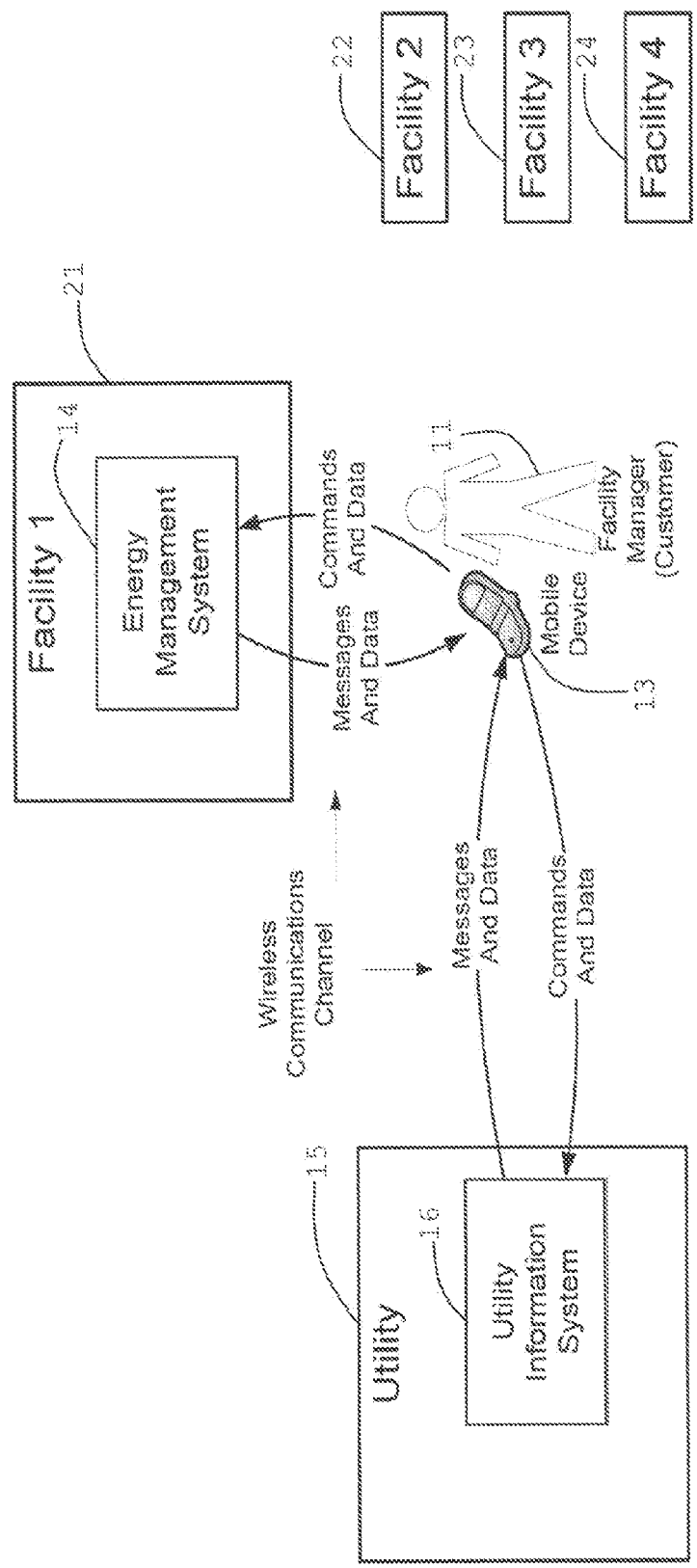
FIG. 3 is a diagram pertaining to energy related interactions among multiple facilities.

FIG. 3 is a diagram of energy related interactions among multiple facilities. The diagram shows the case where FM 11 and MD 13 may be located near a facility 21, but far from facilities 22-24. The diagram shows facility manager 11 which has mobile device 13 for communication with energy management system 14 of a facility 21 and utility information system 16 of utility 15. Communications between mobile device 13 and energy management system 14 and utility information system 16 may be similar to those as indicated by FIG. 2. Facilities 22, 23 and 24 may likewise have energy management systems 14 but are not necessarily communicated with in view of their distance from mobile device 13. Facilities 22, 23 and 24 may be too far for the wireless communications channel to provide good communications between mobile device 13 and any of the facilities 22-24. On the other hand, the EMSs of the other facilities may be communicated with on other wireless frequencies, despite their distances from mobile device 13.

Figure 4:
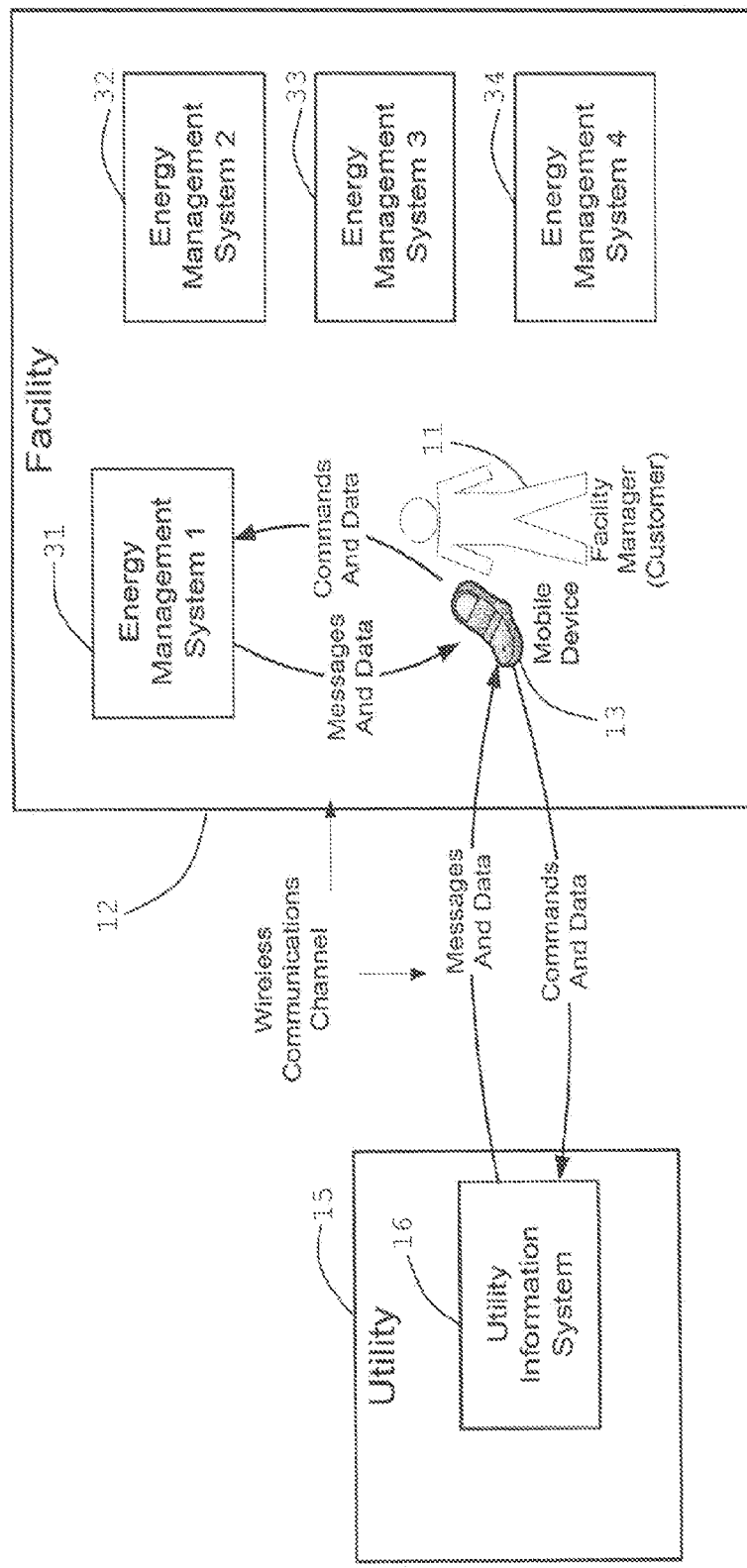
FIG. 4 is a diagram pertaining to energy related interactions among multiple energy management systems.

FIG. 4 is a diagram of energy related interactions among multiple EMS's 31-34 within one facility 12. The diagram shows facility manager 11 who has mobile device 13 for communication with first energy management system 31 of facility 12 and utility information system 16 of utility 15.

Communications between mobile device 13 and energy management system 31 and utility information system 16 may be performed in a similar manner as those as indicated by FIGS. 2 and 3. However, facility 12 may have additional energy management systems 32, 33 and 34. Communications may occur between systems 32-34 in a way like those communications which occur between mobile device 13 and energy management system 31. A sending portion of the energy management systems 32-34 may be coded or tuned to frequencies different than that of energy management system 31, so that they are distinguishable and thus not necessarily responding with messages to messages sent from mobile device 13 specifically to energy management system 31. There may be additional energy management systems at facility 12.

The location of mobile device 13 may affect scenarios or the relevance of knowing something from an item at another location. If one knows the location of mobile device 13, the following items may be modified accordingly. The messages sent from utility 15 (or UIS 16) may be different depending upon the location of MD 13. The information transmitted to utility 15 from MD 13 may also be different depending upon the location of MD 13. The messages sent from EMS 14, 31, 32, 33, 34 may be different depending upon or due to the location of MD 13. The information transmitted to the EMS from MD 13 may be different depending upon the location of MD 13. Regardless of what information is sent to MD 13 from either utility 15 or EMS 14, the information and options presented to a user on MD 13 may be different depending upon the location of MD 13. For examples of different information, a utility 15 may have different agreements with two or more facilities 12 resulting in messages and data from utility information system 16 being different for energy management systems of the two or more facilities 12, 21, 22, 23, 24 at different locations being in communication with mobile device 13 proximate to the different locations of the facilities, at various times, respectively.

To recap, an energy management arrangement may incorporate a mobile device, a utility information system and an energy management system. The mobile device may have a wireless connection with the utility information system and the energy management system for communicating messages, data and commands for managing consumption of energy. The utility information system may be incorporated by a utility. The energy management system may be incorporated by a facility. The facility may consume energy provided by the utility.

The mobile device may be operated by a manager of the facility. The mobile device may receive messages and data from the utility information system and the energy management system. The manager may review the messages and data. The manager may provide commands and/or data to the energy management system via the mobile device. The manager may provide commands and/or data to the utility information system via the mobile device.

If messages and data from the utility to the mobile device indicate demand resource information such as a price change for energy due to a demand resource event, then the manager may send a command to adjust consumption at the facility from the mobile device to the facility.

The utility information system may send a demand resource signal relative to a demand resource event to the mobile device. The manager may review the demand resource signal and send a command via the mobile device to the facility directing a change of consumption as necessary at the facility in response to the demand response event.

The demand resource signal, having information and data, may go to the mobile device. A facility manager may review the demand resource signal at the mobile device. The facility manager may provide a command signal, as needed, to the facility in response to the demand resource signal.

The manager receiving demand resource messages and/or data from the energy management system of a facility may selectively pass the messages and/or data onto the utility.

The utility information system of the utility may send out a demand resource signal specific to a demand resource event to an energy management system of a facility via the mobile device. Upon receipt of a demand resource signal from the utility to the mobile device, the manager may provide commands for adjusting a load of the facility in response to the demand resource signal.

An approach for demand response communications, using a mobile device, may incorporate receiving demand response signals from a utility in response to a demand response event on a mobile device, reviewing messages and/or data in the demand response signals with the mobile device, and sending commands and/or data, as needed, to a facility which uses energy from the utility, with the mobile device.

The approach may further incorporate receiving messages and/or data from the facility with the mobile device, reviewing messages and/or data with the mobile device, and sending resource signals containing commands and/or data to the utility with the mobile device.

The utility may incorporate a utility information system that sends the demand response signals to and/or receives the resource signals from the mobile device. The facility may incorporate an energy management system that receives the commands and/or data from the mobile device and sends messages and/or data to the mobile device.

A mobile device may be a computing device which is portable and transportable as a personal effect of a person.

A mobile device may be selected from a group consisting of cell phones, tablets, laptops, pads, smart phones, and the like.

The mobile device may receive demand response signals from the utility information system and send resource signals to the utility information system via a wireless communications channel.

A demand response energy management structure may incorporate a utility that provides a resource, a facility that can consume the resource, and a mobile device. The utility may incorporate a utility information system. The facility may incorporate an energy management system. The mobile device may establish a wireless communications connection with the utility information system and the energy management system.

The mobile device may receive messages and data from the utility information system and the energy management system. The mobile device may convey commands and data to the utility information system and to the energy management system.

The mobile device may establish a wireless communications connection with one or more other energy management systems within the facility.

The mobile device may establish a wireless communications connection with one or more other energy management systems within one or more other facilities, respectively.

A user of the mobile device may have a mobility to go from one geographical location to another geographical location while communicating with an energy management system and/or the utility information system.

The user may move from one facility to another facility and have a wireless communication connection with one energy management system or another energy management system of a respective facility. Messages and data from the utility information system may be different for two or more facilities. Commands and data from the mobile device may be different for two or more facilities.

Information conveyed by communications sent from the utility information system to the mobile device may be different for various locations of the mobile device relative to a location of the utility information system. Information conveyed by communications transmitted to the utility information system from the mobile device may be different for various locations of the mobile device relative to the location of the mobile device. Information conveyed by communications sent from the energy management system to the mobile device may be different for various locations of the mobile device relative to a location of the energy management system. Information conveyed by communications transmitted to the energy management system from the mobile device may be different for various locations of the mobile device relative to the location of the energy management system. Regardless of what information is sent to the mobile device from either the utility information system or the energy management system, the information and options presented to a user on the mobile device may be different for various locations of the mobile device.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An energy management arrangement comprising:
a mobile device;
a utility information system; and
an energy management system; and
wherein:
the mobile device has a wireless connection with the utility information system and the energy management system for communicating messages, data and commands for managing consumption of energy;
the utility information system is incorporated by a utility;
the energy management system is incorporated by a facility; and
the facility can consume energy provided by the utility; and
wherein:
the utility information system sends a demand resource signal relative to a
demand resource event to the mobile device;
a manager reviews the demand resource signal and sends a command via the mobile device to the facility directing a change of consumption as necessary at the facility in response to the demand resource signal;
the utility information system of the utility sends out a demand resource signal specific to a demand resource event to an energy management system of a facility via the mobile device; and
upon receipt of a demand resource signal from the utility to the mobile device, the manager provides commands for adjusting a load of the facility in response to the demand resource signal.

2. The arrangement of claim 1, wherein:
the mobile device is operated by a manager of the facility;
the mobile device receives messages and data from the utility information system and the energy management system;
the manager reviews the messages and data;
the manager provides commands and/or data to the energy management system via the mobile device; and
the manager provides commands and/or data to the utility information system via the mobile device.

3. The arrangement of claim 2, wherein if messages and data from the utility to the mobile device indicate demand resource information such as a price change for energy due to a demand resource event, then the manager can send a command to adjust consumption at the facility from the mobile device to the facility.

4. The arrangement of claim 2, wherein:
the demand resource signal, having information and data, goes to the mobile device;
a facility manager reviews the demand resource signal at the mobile device; and
the facility manager provides a command signal, as needed, to the facility in response to the demand resource signal.

5. The arrangement of claim 4, wherein the manager receiving demand resource messages and/or data from the energy management system of the facility, selectively passes the messages and/or data onto the utility.

6. A method for demand response communications, using a mobile device, comprising:
receiving demand response signals from a utility in response to a demand response event on a mobile device;
reviewing messages and/or data in the demand response signals with the mobile device; and
sending commands and/or data, as needed, to a facility which uses energy from the utility, with the mobile device; and
wherein:
the utility sends a demand resource signal relative to a demand resource event to the mobile device;
a manager reviews the demand resource signal and sends a command via the mobile device to the facility directing a change of consumption as necessary at the facility in response to the demand resource signal;
the utility sends out a demand resource signal specific to a demand resource event to an energy management system of a facility via the mobile device; and
upon receipt of a demand resource signal from the utility to the mobile device, the manager provides commands for adjusting a load of the facility in response to the demand resource signal.

7. The method of claim 6, further comprising:
receiving messages and/or data from the facility with the mobile device;
reviewing messages and/or data with the mobile device; and
sending resource signals containing commands and/or data to the utility with the mobile device.

8. The method of claim 7, wherein:
the utility comprises a utility information system that sends the demand response signals to and/or receives the resource signals from the mobile device; and
the facility comprises an energy management system that receives the commands and/or data from the mobile device and sends messages and/or data to the mobile device.

9. The method of claim 7, wherein:
the mobile device is a computing device which is portable and transportable as a personal effect of a person; and
the mobile device is selected from a group consisting of a cell phone, a tablet, a laptop, a pad, a smart phone, and the like.

10. The method of claim 9, wherein the mobile device receives demand response signals from the utility information system and sends resource signals to the utility information system via a wireless communications channel.

11. A demand response energy management structure comprising:
a utility that provides a resource;
a facility that can consume the resource; and
a mobile device; and
wherein:
the utility comprises a utility information system;
the facility comprises an energy management system; and
the mobile device can establish a wireless communications connection with the utility information system and the energy management system; and
wherein:
the utility information system sends a demand resource signal relative to a demand resource event to the mobile device;
a manager reviews the demand resource signal and sends a command via the mobile device to the facility directing a change of consumption as necessary at the facility in response to the demand resource signal;

the utility information system of the utility sends out a demand resource signal specific to a demand resource event to an energy management system of a facility via the mobile device; and upon receipt of a demand resource signal from the utility to the mobile device, the manager provides commands for adjusting a load of the facility in response to the demand resource signal.

12. The structure of claim 11, wherein:

the mobile device receives messages and data from the utility information system and the energy management system; and the mobile device can convey commands and data to the utility information system and to the energy management system.

13. The structure of claim 12, wherein the mobile device can establish a wireless communications connection with one or more other energy management systems within the facility.

14. The structure of claim 12, wherein the mobile device can establish a wireless communications connection with one or more other energy management systems within one or more other facilities, respectively.

15. The structure of claim 12, wherein a user of the mobile device has a mobility to go from one geographical location to another geographical location while communicating with an energy management system and/or the utility information system.

16. The structure of claim 12, wherein:

the user can move from one facility to another facility and have a wireless communication connection with one energy management system or another energy management system of a respective facility;

messages and data from the utility information system can be different for two or more facilities; and commands and data from the mobile device can be different for two or more facilities.

17. The structure of claim 12, wherein:

information conveyed by communications sent from the utility information system to the mobile device can be different for various locations of the mobile device relative to a location of the utility information system;

information conveyed by communications transmitted to the utility information system from the mobile device can be different for various locations of the mobile device relative to the location of the mobile device;

information conveyed by communications sent from the energy management system to the mobile device can be different for various locations of the mobile device relative to a location of the energy management system;

information conveyed by communications transmitted to the energy management system from the mobile device can be different for various locations of the mobile device relative to the location of the energy management system; and/or regardless of what information is sent to the mobile device from either the utility information system or the energy management system, the information and options presented to a user on the mobile device can be different for various locations of the mobile device.

18. The structure of claim 11, wherein a mobile device is selected from a group consisting of smart phones, pads, tablets, cell phones, and laptops.

* * * * *